INVENTORS
Thomas E. Molloy
John D. Walters

BY Ashley & Ashley

ATTORNEYS

Aug. 16, 1960 T. E. MOLLOY ET AL 2,948,933
PIPE MOLDING MACHINE AND METHOD
Filed Nov. 12, 1957 12 Sheets-Sheet 4

INVENTORS
Thomas E. Molloy
John D. Walters
BY Ashley & Ashley
ATTORNEYS

INVENTORS
Thomas E. Molloy
John D. Walters
BY
Ashley & Ashley
ATTORNEYS

Aug. 16, 1960   T. E. MOLLOY ET AL   2,948,933
PIPE MOLDING MACHINE AND METHOD
Filed Nov. 12, 1957   12 Sheets-Sheet 7

INVENTORS
Thomas E. Molloy
John D. Walters
BY
ATTORNEYS

Aug. 16, 1960    T. E. MOLLOY ET AL    2,948,933
PIPE MOLDING MACHINE AND METHOD
Filed Nov. 12, 1957    12 Sheets-Sheet 8

INVENTORS
Thomas E. Molloy
John D. Walters

BY *Ahley & Ahley*

ATTORNEYS

Aug. 16, 1960  T. E. MOLLOY ET AL  2,948,933
PIPE MOLDING MACHINE AND METHOD
Filed Nov. 12, 1957  12 Sheets-Sheet 10

INVENTORS
Thomas E. Molloy
John D. Walters

BY *Shley & Shley*
ATTORNEYS

United States Patent Office

2,948,933
Patented Aug. 16, 1960

2,948,933

PIPE MOLDING MACHINE AND METHOD

Thomas E. Molloy, Tyler, and John D. Walters, Winona, Tex., assignors, by mesne assignments, to Woodward Iron Company, Woodward, Ala., a corporation of Delaware Filed Nov. 12, 1957, Ser. No. 695,481

8 Claims. (Cl. 22—36)

This invention relates to new and useful improvements in machines for and methods of molding cast iron pipe.

One object of the invention is to provide an improved machine for continuously molding pipe having means for forming a sand mold in a flask, for spinning the sand lined flask while casting a pipe therein, for ejecting the sand mold and pipe from said flask and for conveying said flask to and from the forming, spinning and ejecting means whereby the machine is substantially automatic in operation.

Another object of the invention is to provide an improved pipe molding machine having a sand blowing station for forming a mold in a flask around a pattern, a spinning station for rotating the sand lined flask about its longitudinal axis while introducing molten metal to cast a pipe therein, an ejecting station for removing the sand mold and cast pipe from said flask, conveying means for moving said flask between the stations and means actuated by the movement of said flask for controlling the movement of following flasks so as to position the same for sequential and simultaneous operation of said stations.

A further object of the invention is to provide an improved pipe molding machine, of the character described, having a pair of superimposed tracks for conveying flasks between the blowing, spinning and ejecting stations and elevators at the ends of the tracks for shifting the flasks from one track to another whereby the movement of said flasks is substantially automatic and continuous.

Another object of the invention is to provide an improved pipe molding machine, of the character described, wherein the flasks are supported with their longitudinal axes in horizontal planes during the sand blowing, spinning and ejecting operations whereby said flasks may be readily conveyed between the stations without the necessity of handling the same or changing the relative positions thereof so as to effect a considerable saving in time and labor and consequent expense.

An important object of the invention is to provide an improved method of continuously molding pipe which is substantially automatic and continuous and wherein a sand mold is formed in a flask which is then spun during casting of a pipe therein and then the mold and pipe are removed from the flask for receiving another sand mold and the casting of another pipe therein.

A particular object of the invention is to provide an improved pipe molding method, of the character described, having separate mold forming, flask spinning and pipe removing stations whereby a plurality of pipe may be molded simultaneously in a continuous operation.

A further object of the invention is to provide an improved method, of the character described, wherein the flasks are maintained in horizontal positions to facilitate movement of the same between the stations as well as the mold forming, flask spinning and pipe ejecting operations and thereby reduce the time, labor and expense of molding pipe.

A construction designed to carry out the invention will be hereinafter described, together with other features of the invention.

The invention will be more readily understood from a reading of the following specification and by reference to the accompanying drawings, wherein examples of the invention are shown, and wherein:

In the drawings, the numeral 10 designates a pipe molding machine embodying the principles of the invention for carrying out the method thereof. The machine includes a sand mold blowing station 11, a flask spinning and pipe casting station 12, a sand mold and cast pipe ejecting station 13, a pair of superimposed tracks 14 and 15 for conveying cylindrical flasks 16 between the stations and elevators 17 and 18 at the ends of the tracks for shifting the flasks therebetween. The novel method of this invention involves the substantially automatic and continuous molding of pipe by forming a sand mold in a flask around a complementary pattern, removing the pattern from the flask, centrifugally casting a pipe in the sand lined flask, ejecting the sand mold and cast pipe from said flask, conveying said flask between the steps of the method and maintaining said flask with its longitudinal axis in a horizontal plane throughout said method. The latter is important because it facilitates positioning of the flask for performing the steps of the method and the conveyance of said flask therebetween as well as the simultaneous performance of said steps which permits the handling of a plurality of flasks at one time. Due to this method, the pipe is more uniform and the time and labor required is reduced so as to effect a considerable saving in the cost of molding.

Figures 1, 12:
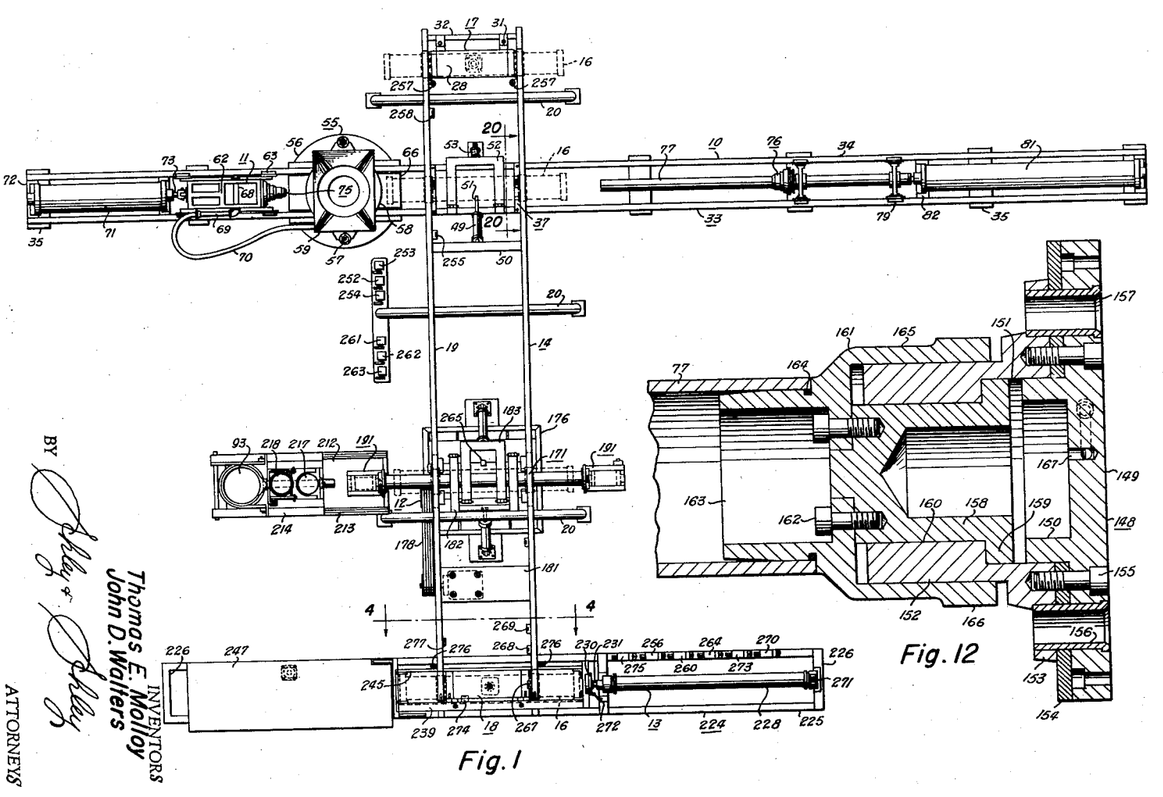
Fig. 1 is a plan view of molding machine constructed in accordance with the invention.
Fig. 12 is a view, similar to Fig. 10, of another hub assembly.
Figures 2, 9:
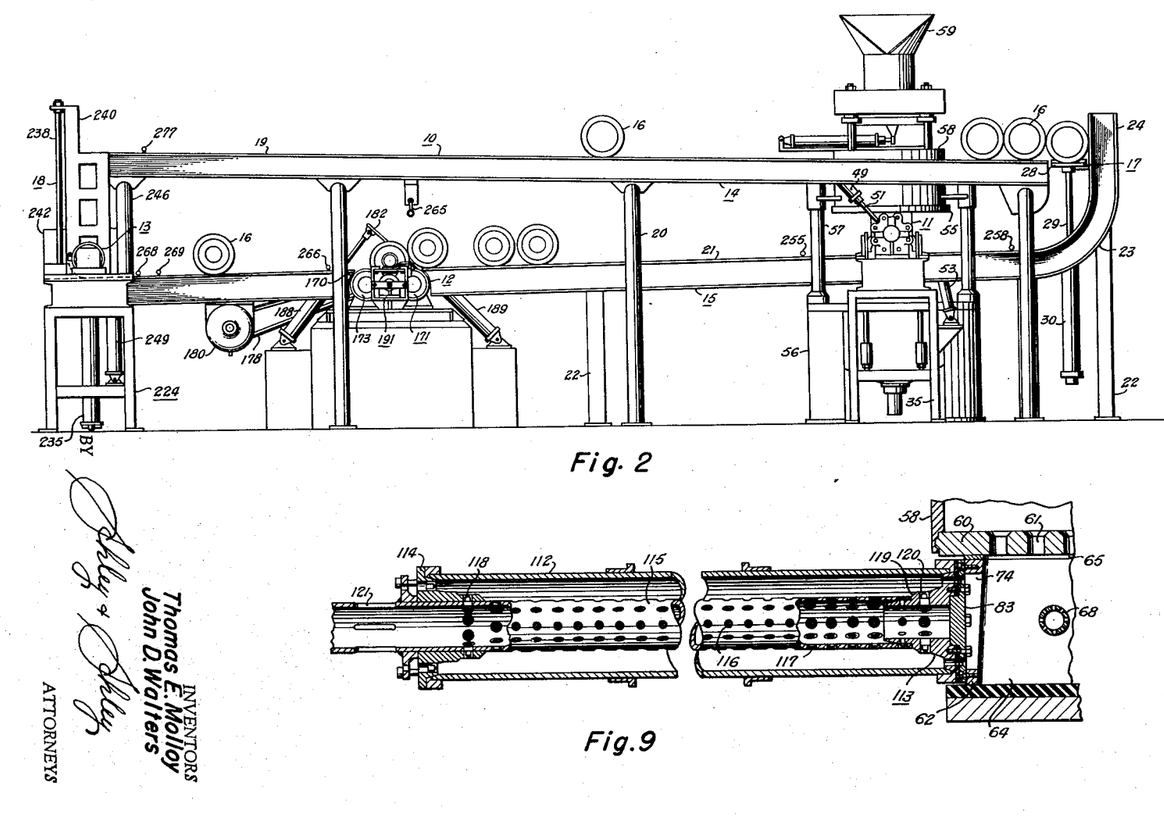
Fig. 2 is a side elevational view of the machine.
Fig. 9 is a view, similar to Fig. 6, showing a solid flask and perforated pattern.
Figure 5:
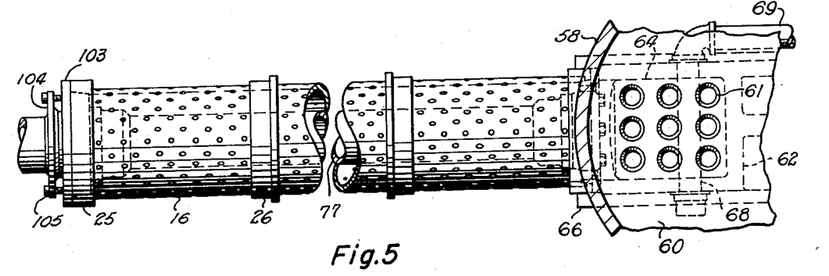
Fig. 5 is a horizontal, cross-sectional view through the blower showing a flask in position for blowing sand thereinto.
Figure 6:
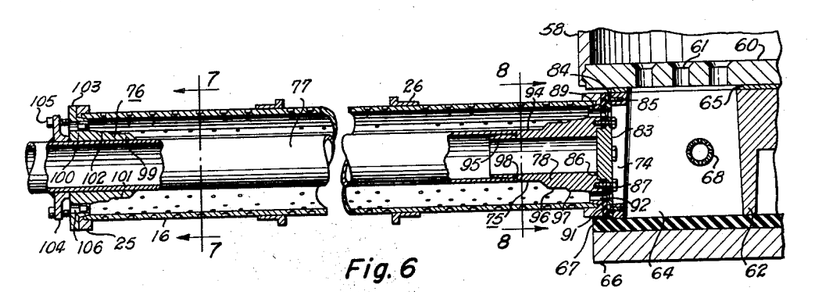
Fig. 6 is a longitudinal, vertical, sectional view through the flask and blow box.
Figures 13, 23:
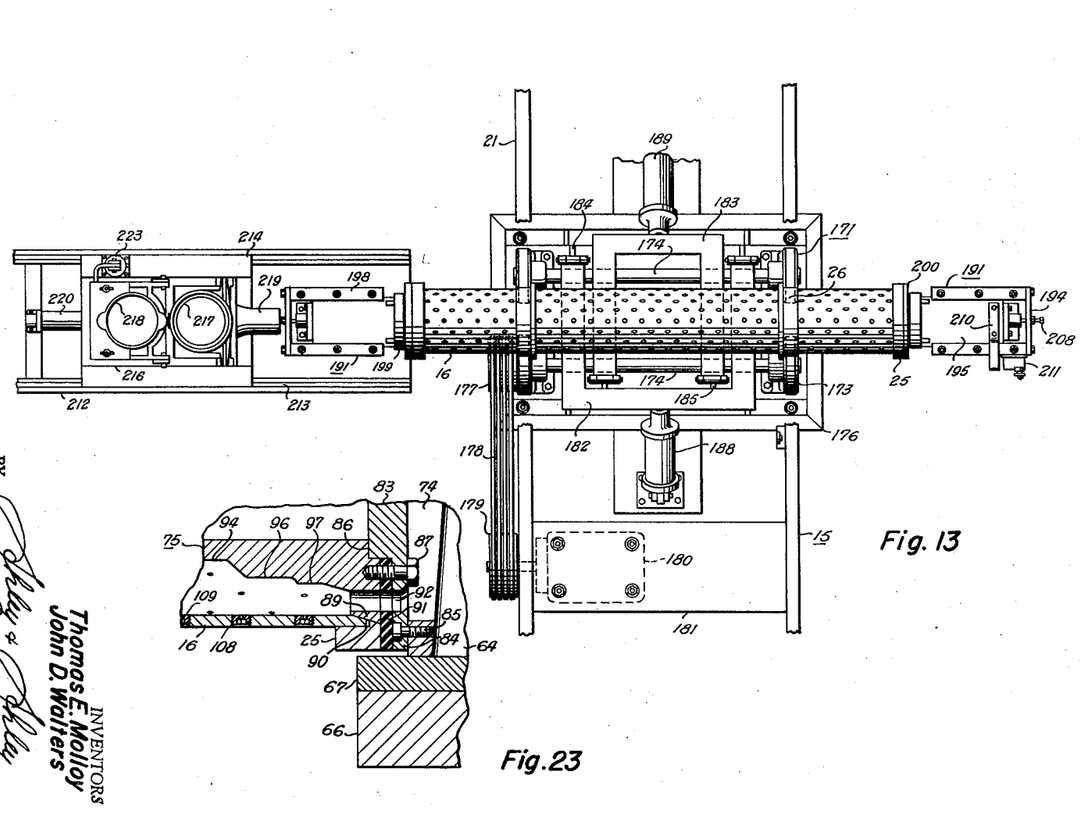
Fig. 13 is a plan view showing the mechanism for spinning a flask and casting a pipe therein.
Fig. 23 is an enlarged, detailed view of a portion of the construction shown in Fig. 6.

As shown in Figs. 1 and 2, the upper track 14 includes a pair of parallel, spaced beams or rails 19 which are supported by inverted U-shaped standards 20 and which are inclined downwardly from the elevator 18 toward the elevator 17 for conveying the flasks 16 from the ejecting station 13 to the blowing station 11. Similar beams or rails 21, which are supported by upright posts 22, underlie the beams 19 and are inclined downwardly from the elevator 17 toward the elevator 18 for conveying the flasks from the blowing station to the spinning station 12 and then to the ejecting station 13. Although the upper track beams 19 are continuous, the lower track beams 21 are interrupted at the blowing and spinning stations. For coacting with the elevator 17, the lower track has an upwardly curved portion 23 below said elevator and an upright portion 24 spaced from the end of the upper track for receiving said elevator therebetween. Due to this arrangement, flasks lowered from the upper track by the elevator 17 are confined against displacement by the upright portion 24 and engage the curved portion 23 so as to roll onto the lower track from said elevator. As shown most clearly in Figs. 5 and 6, each flask 16 is in the form of a sleeve or tube having external collars 25 at its ends and a pair of intermediate, flanged tires 26 which are spaced to ride on the beams 19 and 21 of the tracks and support the flask at a right angle thereto. Preferably, the collars 25 are angular in cross-section so as to overlie the ends of the tube (Figs. 6 and 23). The elevator includes a horizontal carriage or platform 28 mounted on the upper end of the piston rod 29 of an upright pressure fluid cylinder 30 and slidably mounted on a pair of upright guide rods 31 which are supported by horizontal cross bars 32 extending between the upper and lower ends of the upright track portion 24 (Fig. 3) whereby said elevator is disposed between the beams of the tracks.

At the blowing station 11, a horizontal track 33 is formed by a pair of parallel, spaced beams or rails 34, similar to and intersecting the lower beams at a right angle and supported by upright standards 35. As shown by the numeral 36 in Figs. 19 and 20, the beams 21 are cut away and recessed for receiving and connecting the rails 34 thereto with the upper surfaces of said rails slightly below the upper surfaces of said beams. A flask alining device 37 is mounted on the rails and includes a pair of cross bars 38 overlying and secured by screws 39 to said rails for supporting a pair of coacting wedge elements or V-blocks 40 in alinement with each beam. Each wedge element is in the form of an L-shaped bar having a lateral flange 41 at its outer end and an angular upper surface 42 which is inclined upwardly from its ends toward an apex 43 adjacent its inner end. The wedge elements 40 overlie the outer sides and ends of the bars 38 and have longitudinal slots 44 for receiving screws 45 to clamp said elements in engagement with said sides. Adjusting screws 46 extend through the lateral flanges 41 and are screwthreaded in the ends of the cross bars for holding the wedge elements with their inner ends in coaxial relation to the longitudinal axis of the track 33. The pairs of wedge elements coact to support a flask by its flanged tires 26 between the apices 43 of their upper surfaces 42, the flask tires rolling from the beams 21 onto said surfaces and over said apices. An upright plate 47 is fastened to the outer side of each beam by bolts and nuts 48 in overlying relation to the outer end portions of the recess 36 and wedge element of each pair which is initially engaged by the flask tire to reinforce the same. For preventing the flask from rolling over and past the alining device 37, a pressure fluid cylinder 49 depends at an angle from a cross bar 50 between the upper track beams 19 and has its piston rod 51 projecting toward said device in the path of said flask (Figs. 1 and 2). The flask is adapted to be lifted from the alining device by a yoke or U-shaped member 52 which is hinged to the inner rail 35 between the bars 38 of said device and which is actuated by a pressure fluid cylinder 53.

Figure 3:
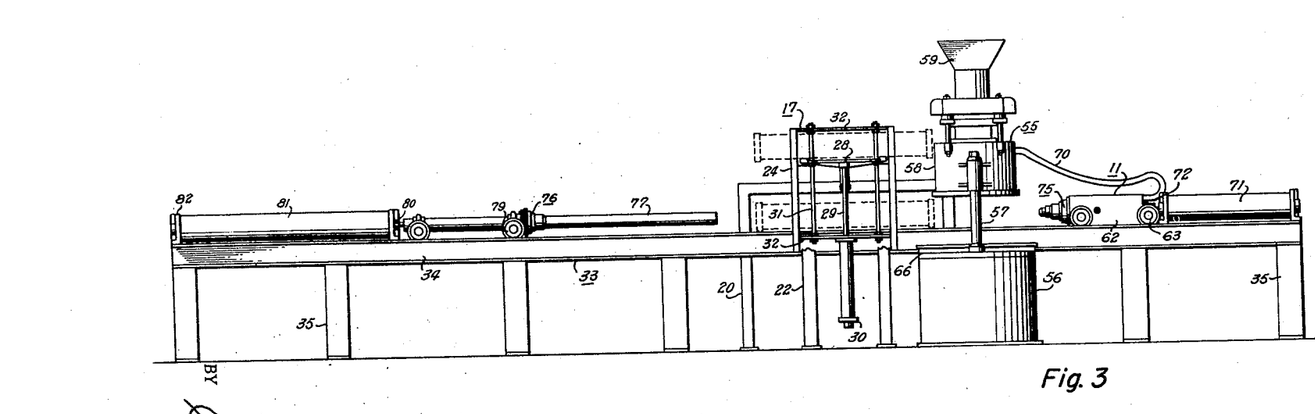
Fig. 3 is an end elevational view of the machine.
Figure 4:
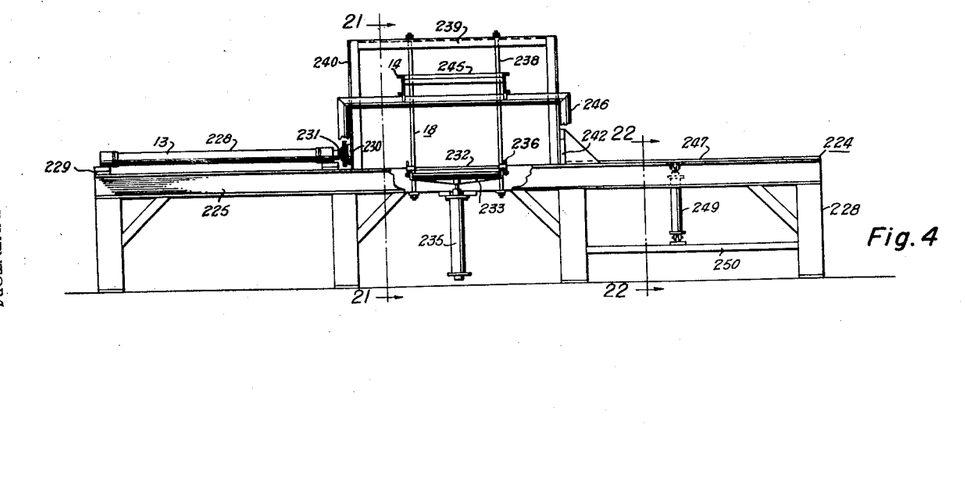
Fig. 4 is a transverse, vertical, sectional view, taken on the line 4—4 of Fig. 1.

A sand blower 55 straddles the track 33 adjacent the alining device and includes a base 56 underlying said track and having upstanding posts 57 for supporting a sand box 58 and hopper 59 thereabove. As shown most clearly in Figs. 5 and 6, the sand box 58 includes a horizontal bottom plate 60 having a plurality of openings 61 for discharging sand which is agitated in said box in the usual manner. For coacting with the sand box, as will be explained, a reciprocal blow box 62 is mounted on the track by suitable wheels 63 and is in the form of a rectangular housing having a chamber 64 for underlying the bottom plate 60 and communicating with the openings 61. The chamber 64 has open upper and lower ends and a gasket 65 seals off between its upper end and the bottom plate. A draw table 66, having a sealing pad 67 of rubber or other suitable material on its upper surface, is mounted on the base 56 for upward movement between the track rails 34 to engage the pad with the bottom of the blow box 62 and close the lower end of the chamber 64. In order to aerate and agitate the sand in the chamber, a horizontal, perforated pipe 68 extends transversely therethrough and is connected to a source of air under pressure by an external pipe 69 and hose 70. A horizontal pressure fluid cylinder 71 is supported by angular, upright brackets 72 at one end of the track and has its piston rod 73 connected to the outer end of the blow box 62 for reciprocating said box to move its chamber 64 into and out of registration with the sand box openings 61 (Figs. 1 and 3).

Figure 8:
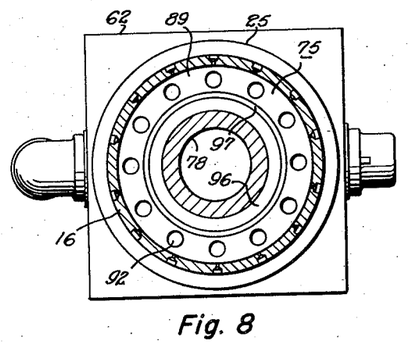
Fig. 8 is a transverse, vertical, sectional view, taken on the line 8—8 of Fig. 6.

The opposite end of the blow box has a large, circular opening 74 communicating with the chamber and a pattern assembly 75 overlies and extends horizontally from the opening for mating engagement with one end of the flask 16 and its end collar 25 (Fig. 6). A somewhat similar pattern assembly 76 is adapted to engage the opposite end of the flask and its collar and includes an elongated, tubular core member or mandrel 77 for extending coaxially through said flask and engaging a cylindriform pattern element or nipple 78 which forms a part of the assembly 75. For reciprocating the pattern assembly 76 into and out of engagement with the flask, the outer end portion of the mandrel 77 carries wheels 79 for mounting said assembly on the track 34 and is connected to the piston rod 80 of a cylinder 81, similar to the cylinder 71 and supported by similar brackets 82 (Figs. 1 and 3). The pattern assembly 75 includes a circular plate 83 closing the opening 74 and having a radial flange 84 of reduced thickness attached to the blow box by a ring of screws 85 (Figs. 6 and 23). An annular recess 86 is formed in the inner end of the nipple 78 for receiving the axial portion of the plate 83 and a ring of screws 87 connect said nipple and plate. The nipple has a radial shoulder 89 surrounding its recess 86 for mating engagement within the end collar 25 of the flask 16, the surfaces of which are bevelled or chamferred internally as shown at 90. A gasket 91 is confined between the nipple and plate flange 84 by the screws 87 for sealing engagement with the outer end of the flask collar. A plurality of circular openings or ports 92 extend through the plate flange 84, gasket 91 and nipple shoulder 89 for establishing communication between the chamber 64 and flask (Fig. 8).

Figure 7:
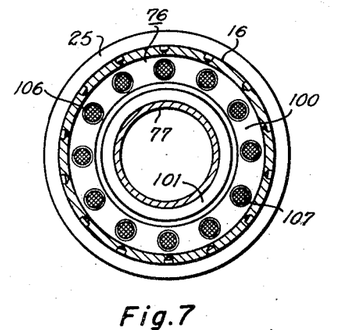
Fig. 7 is a transverse, vertical, sectional view, taken on the line 7—7 of Fig. 6.

Although the shape of the pattern element or nipple 78 is subject to variation in accordance with the type of joint desired on the end of the pipe to be molded, such as hub or spigot, the hub type is shown and includes a medial portion 94 of substantially the same diameter as the mandrel 77, a reduced extremity 95 for slidably engaging in said mandrel and a pair of radial, stepped enlargements or shoulders 96 and 97 between its medial portion and shoulder 89. A seal ring 98 may be carried by the extremity 94 for sealing engagement with the bore of the mandrel. The pattern assembly 76 is similar and includes a similar pattern element or nipple 99 having a press fit on the mandrel, a bevelled, radial shoulder 100 for engaging within the opposite end of the flask and its collar, and a pair of radial, stepped shoulders 101 and 102 which are similar to the shoulders 96 and 97. A radial flange 103 is formed on the outer end of the pattern element 99 for bearing against the flask collar and connecting said element by a ring of screws 104 to a collar 105 welded or otherwise secured to the mandrel. For discharging air from the flask, a plurality of circular ports or openings 106 extend through the shoulder 100. The ports 106 are similar to the ports 92 and have screen plugs 107 therein to prevent the escape of sand while permitting the passage of air from the flask (Fig. 7).

Figure 10:
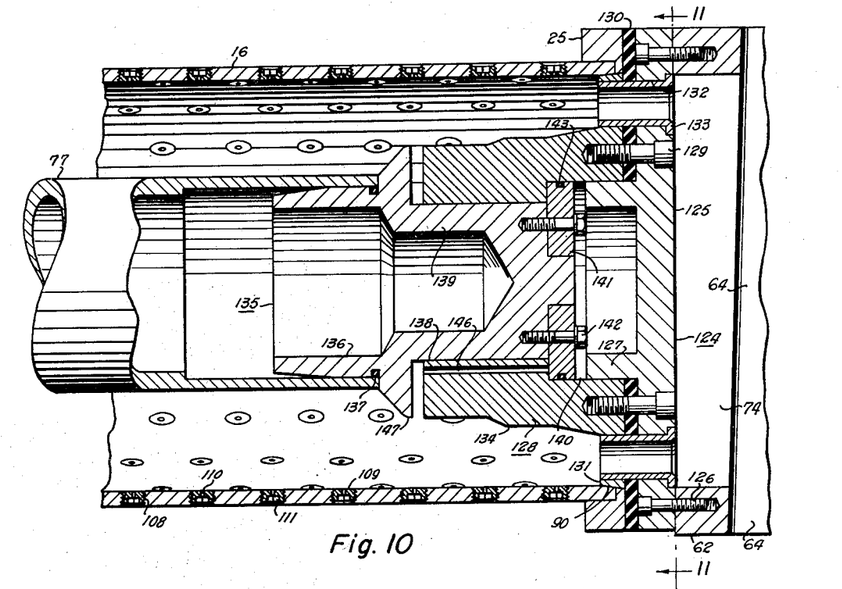
Fig. 10 is an enlarged, longitudinal, vertical sectional view of a portion of the blow box and flask showing a modified hub assembly.

As shown most clearly in Fig. 10, a plurality of radial orifices or ports 108 are formed in the wall of the flask and have vent plugs 109 screw-threaded therein. Each vent plug has an axial aperture or bore 110 of small diameter at its inner end and an enlarged bore 111 at its outer end so as to permit the venting of air while preventing the passage of sand as well as clogging of the orifices 108. Although it is preferable to vent the flask, the air may be discharged through the bore of the tubular core member or mandrel. As shown in Fig. 9, an unvented flask 112 is adapted to be supported by pattern assemblies 113 and 114 which are similar to the assemblies 75 and 76 and which coact with a modified mandrel 115 having a plurality of screened openings or ports 116 extending radially through its wall. The ports 116 are similar to the ports 106 and radial vent orifices 117 and 118, similar to the vent orifices 108, are formed in the assemblies 113 and 114 for communicating with the endmost ports 116 which underlie said assemblies. Although the assembly 114 is substantially identical to the assembly 76 and is secured to the mandrel 115 in the same manner, the assembly 113 is shown as being of the spigot type and has a single radial enlargement or shoulder 119 in place of the shoulders 96 and 97. A ring of vent orifices 120, similar to the orifices 117 and 118, are formed in the shoulder 119. Otherwise, the assembly 113 is substantially identical to the assembly 75 and is adapted to be supported by the plate 83 which overlies the opening 74 of the blow box 62 for mating engagement with the mandrel. A plurality of elongated openings or slots 121 are formed in the mandrel outwardly of the flask 112 for exhausing air which enters the bore of said mandrel through the ports 116 and orifices 117, 118 and 120.

Figure 14:
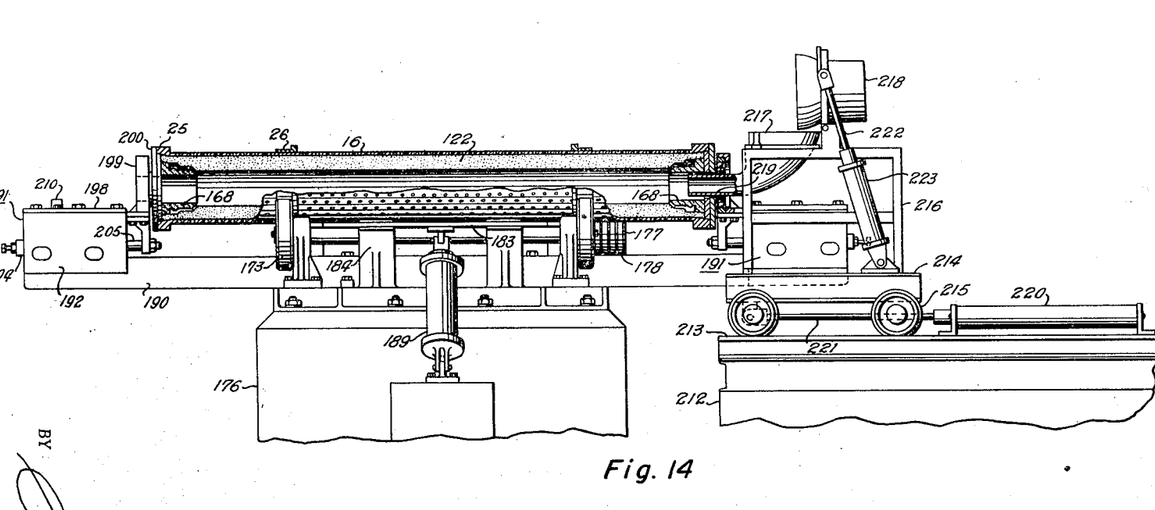
Fig. 14 is a longitudinal, vertical, sectional view of a sand lined flask clamped in position for spinning and casting.
Figure 17:
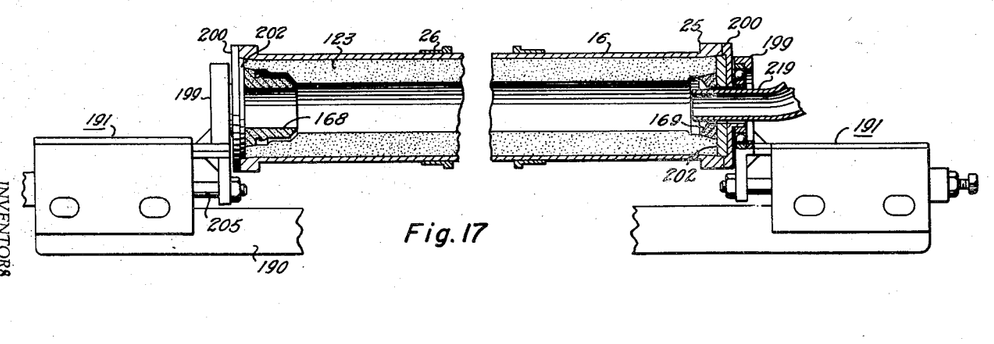
Fig. 17 is a view, similar to Fig. 14, showing a sand lined flask for molding a single hub pipe.

In either construction, sand is discharged from the blower 58 into the chamber 64 and is blown into the annular space between the flask 16 or 112 and the mandrel 77 or 115 to form a double hub or single hub sand mold 122 or 123 (Figs. 14 and 17). As has been explained, the pattern assemblies 75 and 76 or 113 and 114 coact with the flask and mandrel to form the ends of the sand mold. The air is exhausted through the vented flask 16 or the vented mandrel 115, while the escape of the sand is prevented. Of course, a portion of the air escapes through the ports 106 of the assembly 76 or the similar ports of the assembly 114. It is noted that a spigot type assembly, such as the assembly 113 unvented, may be substituted for the hub type assembly 75 to form a single hub sand mold.

Figure 11:
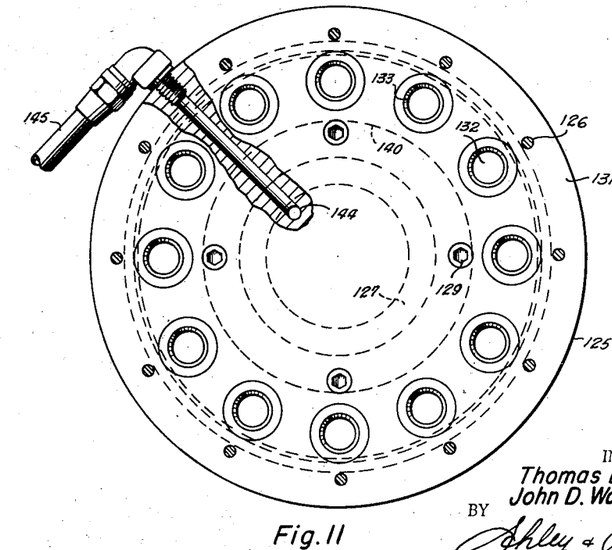
Fig. 11 is a transverse, vertical, sectional view, taken on the line 11—11 of Fig. 10.

In blowing double hub sand molds, it is difficult to form a firm shoulder on the end of the mold adjacent the blow box 62 due to the turbulence created by the jetting of air and sand from the chamber 64. In order to compact this shoulder of the mold, a squeeze assembly 124 has been provided as shown in Figs. 10 and 11 and includes a circular plate 125 attached by a ring of screws 126 in overlying relation to the opening 74 of the blow box. An annular flange 127 extends axially from the plate 125 for receiving a pattern element or nipple 128, similar to the pattern element 78 and connected to said plate by a ring of screws 129 with a gasket 130 confined therebetween for sealing engagement with the end collar 25 of the flask 16. The nipple 128 has an external, radial shoulder 131 overlying the gasket 130 for engaging the internal bevelled surface 90 of the flask and its collar. Ports 132, similar to the ports 92 and having bushings 133, extend through the plate, gasket and shoulder between the screws 126 and 129 to establish communication between the chamber 64 and the flask. It is noted that the ports 92 may have similar bushings. The nipple is of greater diameter than the mandrel 77 to provide one of the radial enlargements or shoulders of the double hub type and has another shoulder 134 intermediate its ends. A piston member 135 is supported by the nipple and has a reduced outer extremity 136 for telescoping engagement with the bore of the mandrel, the extremity being similar to the extremity 95 and carrying a similar seal ring 137. The nipple has an axial bore 138 for slidably receiving the inner end portion 139 of the piston member 135 and a counterbore 140 for reciprocal engagement by an enlarged piston ring or annular piston 141 which is fastened to said piston member portion by a ring of screws 142. It is noted that the axial flange 127 of the plate 125 engages in the counterbore 140 and provides a stop for the piston ring 141. A seal ring 143 is carried by the piston ring for sealing engagement with the counterbore which forms a cylinder for said piston ring.

Air or other fluid under pressure is supplied to the counterbore or cylinder by an angular port 144 which extends through the plate 125 and which has its outer end connected with a suitable conductor 145 (Fig. 11). A vent opening 146 extends axially through the outer portion of the nipple 128 for establishing communication between the outer end of the cylinder and the flask 16 so as to permit the escape of air or other pressure fluid upon outward movement of the piston ring 141. The piston member 135 has an external, radial enlargement or shoulder 147, intermediate its extremities 136 and 139 and bevelled toward said extremity 136, for engaging the end of the mandrel 77 and coacting with the outer end of the nipple. It is noted that the effective length of the squeeze assembly 124, particularly its nipple 128 and piston member 135, is slightly less than the desired length of the joint of the sand mold. This reduction in length is of the order of one-quarter of an inch and is represented by the travel of the piston member relative to the nipple and permits additional inward movement of the mandrel. Although the piston member is extended upon initial engagement with the mandrel, it is retracted or forced inwardly by said mandrel to engage its shoulder 147 with the nipple. This provides increased space for sand and initially makes the inner shoulder of the sand mold closer to its end. Upon retraction of the mandrel, the pressure within the cylinder 140 forces the piston member outwardly whereby the same follows the mandrel 77 and its shoulder 147 compacts the inner shoulder of the sand mold.

A modified squeeze assembly 148 is shown in Fig. 12 and includes a plate 149 similar to the plate 125 and having a similar, annular, axial flange 150 for engaging within the axial counterbore 151 of an inner pattern element or collar 152. A shoulder 153, similar to the shoulder 131, is formed on the inner collar 152 for mating engagement with the flask and its end collar and overlying a gasket 154 which is confined between said collar and the plate 149 by connecting screws 155. Ports 156 and bushings 157, similar to the ports 132 and bushings 133, extend through the plate, gasket and shoulder externally of the screws 155. For coacting with the counterbore 151 to slidably support a piston member 158 and its external, radial flange 159, the collar 152 has a coaxial bore 160. A pattern element or outer collar 161 is fastened by screws 162 to the outer end of the piston member 158 and has a reduced outer extremity 163 which is similar to the extremity 136 and carries a similar seal ring 164 for engaging the bore of the mandrel. As shown by the numeral 165, the inner portion of the outer collar is of enlarged diameter for slidable engagement upon the inner collar 152 and to provide one of the radial enlargements or shoulders to form the joint of the sand mold. Another enlargement 166 of greater diameter is formed on the inner end of the collar 163. The counterbore 151 functions as a cylinder for the flange 159 of the piston 158 and air or other fluid under pressure is supplied thereto by an angular port 167, similar to the port 144, formed in the plate 149. The squeeze assembly 148 functions in the same manner as the squeeze assembly 124, with the piston member and outer collar being reciprocated inwardly relative to the inner collar upon engagement of said outer collar by the mandrel 77. The fluid pressure within the cylinder 151 forces the piston member and outer collar to follow the mandrel outwardly upon its retraction so that the shoulders 165 and 166 of said collar compact the shoulders of the sand mold.

After forming the sand mold, the cylinders 71 and 81 are actuated to retract the blow box 62 and its pattern assembly and the mandrel 77 and its pattern assembly. Due to its length, it is desirable to commence retraction of the mandrel first irrespective of whether the pattern assembly of the blow box is of the squeeze type. As has been explained, the fluid cylinder 53 is actuated to raise the yoke 52 for lifting the sand lined mold from the alining device 37 onto the beams 21 of the lower track 15 (Figs. 1 and 2). While rolling down the track to the spinning and casting station 12, suitable end cores of sand or other suitable material are inserted in the ends of each flask. As shown by the numeral 168 in Fig. 14, both end cores are of the hub type for coacting with the double hub sand mold 123. In Fig. 17, a spigot type of core 169 is substituted for one of the cores 168 to coact with the single hub sand mold 123.

Figure 18:
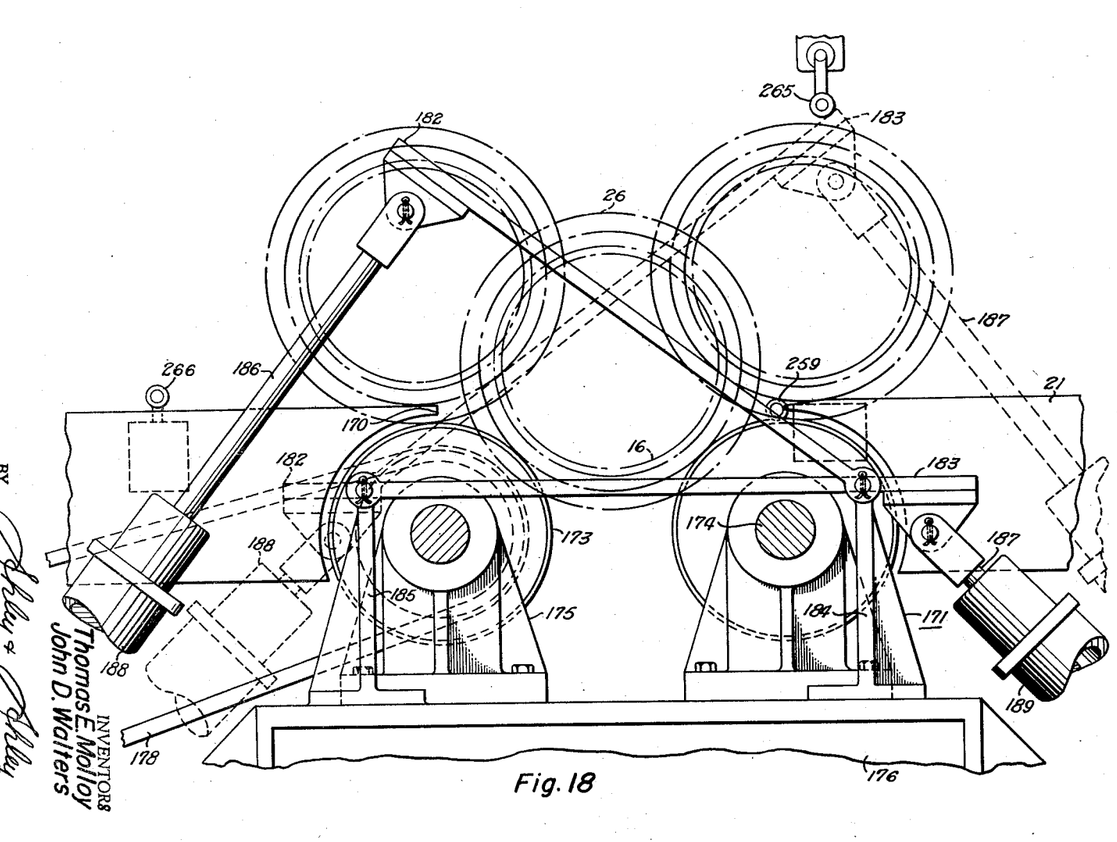
Fig. 18 is an enlarged, longitudinal, sectional view showing the mechanism for moving a flask into and out of position for spinning and casting.

As shown by the numeral 170 in Figs. 2 and 18, the lower track beams 21 are interrupted at the spinning and casting station 12 to accommodate a flask spinning assembly 171 which includes pairs of wheels 173 mounted on a pair of horizontal shafts 174 in alinement with said beams for supporting the flask 16 by its tires 26. The shafts 174 extend transversely of and below the upper surfaces of the track beams and are journaled in suitable pillow blocks 175 which are mounted on an elevated base 176. One of the shafts 174 carries drive pulleys 177 at one end for connection by endless belts 178 to the drive pulleys 179 of a motor 180 which is suspended from a cross bar 181 extending between the track beams. Hinged yokes 182 and 183 are pivotally supported between the wheels 173 by pedestals 184 and 185 upstanding from opposite sides of the base 176 adjacent the interrupted ends 170 of the track beams for lowering the flask onto said wheels and lifting said flask therefrom (Fig. 13). The yokes are similar to the yoke 52 and are actuated by the piston rods 186 and 187 of pressure fluid cylinders 188 and 189. As shown most clearly in Fig. 18, the yokes extend in opposite directions with the yoke 182 being raised by clockwise pivoting and lowered by movement in the opposite direction. Counter-clockwise pivoting raises the yoke 183 which is lowered by movement in the opposite direction. The flask rolling down the track beams engages the yoke 182 and is lowered thereby to rest on the wheels. When the spinning and casting operation is completed, the yoke 183 is raised to lift the flask and direct the same along the track beams towards the ejecting station 13.

Figure 15:
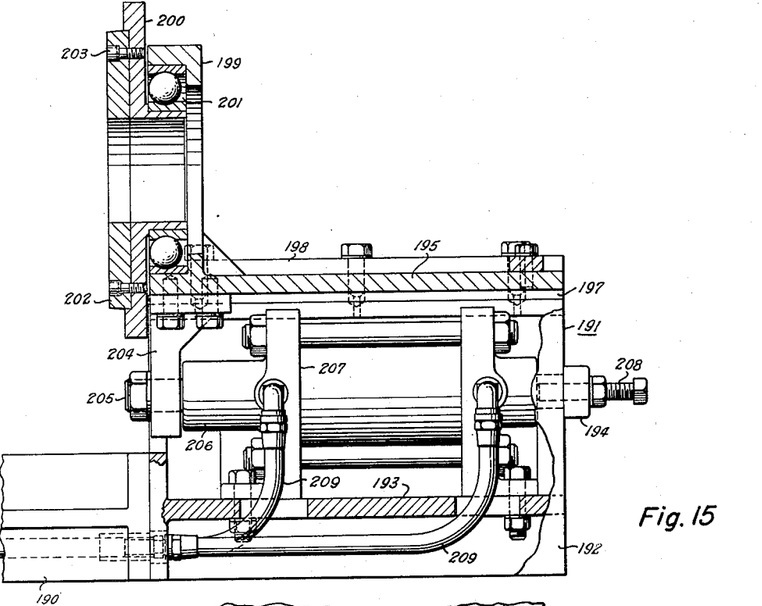
Fig. 15 is an enlarged, side elevational view, partly in section, of one of the end clamp assemblies.
Figure 16:
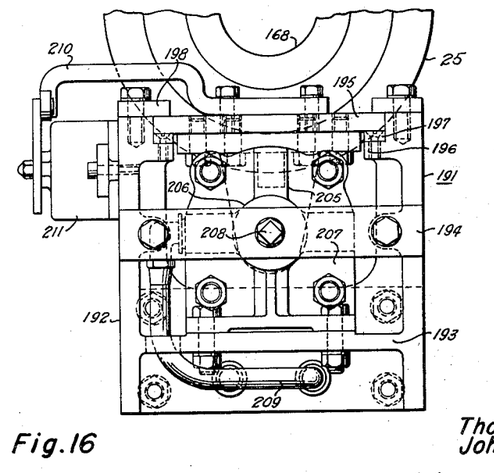
Fig. 16 is an enlarged, end elevational view of the clamp assembly.

For rotatably supporting the flask during the spinning and casting operation, a horizontal transverse beam 190 is suitably secured to the upper surface of the base 176 in vertical alinement with the flask resting on the wheels 173 and has an end core holder 191 mounted on each end thereof (Figs. 13-17). Each core holder includes a pair of upright side walls 192 extending longitudinally of the beam 190 and connected by a bottom wall or partition 193 and a horizontal cross bar 194 at one end (Figs. 15 and 16). A reciprocal plate 195 is slidably mounted by and between the upper portions of the side walls 192 upon inwardly directed horizontal flanges or shoulders 196 coextensive with said walls and having wear rails 197 thereon. The reciprocal plate 195 is confined against upward displacement by overlying bars 198 which are suitably fastened to the side walls. An upstanding, annular bracket or collar 199 is carried by the inner end of the reciprocal plate for rotatably supporting an annular pressure plate or ring 200. The bracket 199 and pressure plate 200 are angular in cross-section and have a ball bearing assembly 201 interposed therebetween. An annular plate or ring 202 is fastened to the pressure plate 200 by a ring of screws 203 for engaging within the flask when said plate bears against the end collar 25 (Figs. 14 and 17).

For reciprocating the annular plates 200 and 202 into and out of engagement with the end of the flask, a bracket 204 depends from the plate 195 for connection with the piston rod 205 of a horizontal pressure fluid cylinder 206 which is supported by brackets 207 upstanding from the bottom plate 193. A set screw 208 is carried by the cross bar 194 for bearing against the outer end of the cylinder 206 to facilitate accurate adjustment of said cylinder. Air or other fluid under pressure is supplied to and exhausted from the ends of each cylinder by suitable conductors 209. An angular lever 210 extends laterally from one of the reciprocal plates 195 for actuating a switch 211 mounted on one of the core holders 191.

As shown in Figs. 1, 13 and 14, a platform 212 underlies one of the end core holders 191 and has a pair of track rails 213 extending longitudinally of the beam 190 for supporting a carriage 214 by its wheels 215. The carriage 214 is adapted to straddle the beam and core holder and includes an open frame 216 having a conventional shoe 217 at its inner end and a ladle 218 pivotally mounted at its outer end for pouring molten metal into the shoe. The shoe 217 is angular and has its reduced spout 219 projecting horizontally from the carriage for extending longitudinally through the axial openings of the annular plates 200 and 202 and into or through the end cores 168 and 169. A pressure fluid cylinder 220 extends longitudinally of the platform 212 and has its piston rod 221 connected to the carriage 214 for reciprocating the shoe into and out of operative position. The ladle 218 is adapted to be tilted into and out of pouring position by the piston rod 222 of a pressure fluid cylinder 223 which is pivotally mounted on the carriage. It is noted that the core holders rotatably support the flask during spinning thereof and facilitate insertion of the shoe 217 for pouring of the molten metal into said flask whereby the pipe is cast by centrifugal action. Upon completion of the casting operation, the carriage 214 is retracted to withdraw the shoe and spinning of the flask is stopped to permit retraction of the core holders 191. As shown by the numeral 93 in Fig. 1, a large ladle may be pivotally mounted on the outer end of the platform 212 for supplying molten metal to the ladle 218.

As has been explained, the sand lined flask with the pipe cast therein is lifted from the wheels 173 by the yoke 182, as shown in broken lines in Fig. 18, for rolling down the lower track beams 21 to the ejecting station 13. An elongated, horizontal frame 224 extends transversely of the lower track and includes a pair of longitudinal beams 225 connected by end beams 226 and supported by upright standards 227 similar to the standards 35 (Figs. 1, 2, 4, 21 and 22). The beams 225 are disposed slightly below the outer end portions of the track beams which are recessed at 172 so as to have portions overlying said beams 225. A flask stop 278 is mounted on the outer end of each track beam beyond the elevator 18. A pressure fluid cylinder 228 extends longitudinally of one end of the frame 224, being supported by brackets 229 similar to the brackets 72 and 82, and has a circular ram or head 230 on its piston rod 231 for telescoping engagement with the flask to eject the sand mold, end cores and cast pipe therefrom.

Figures 19, 20, 21, 22:
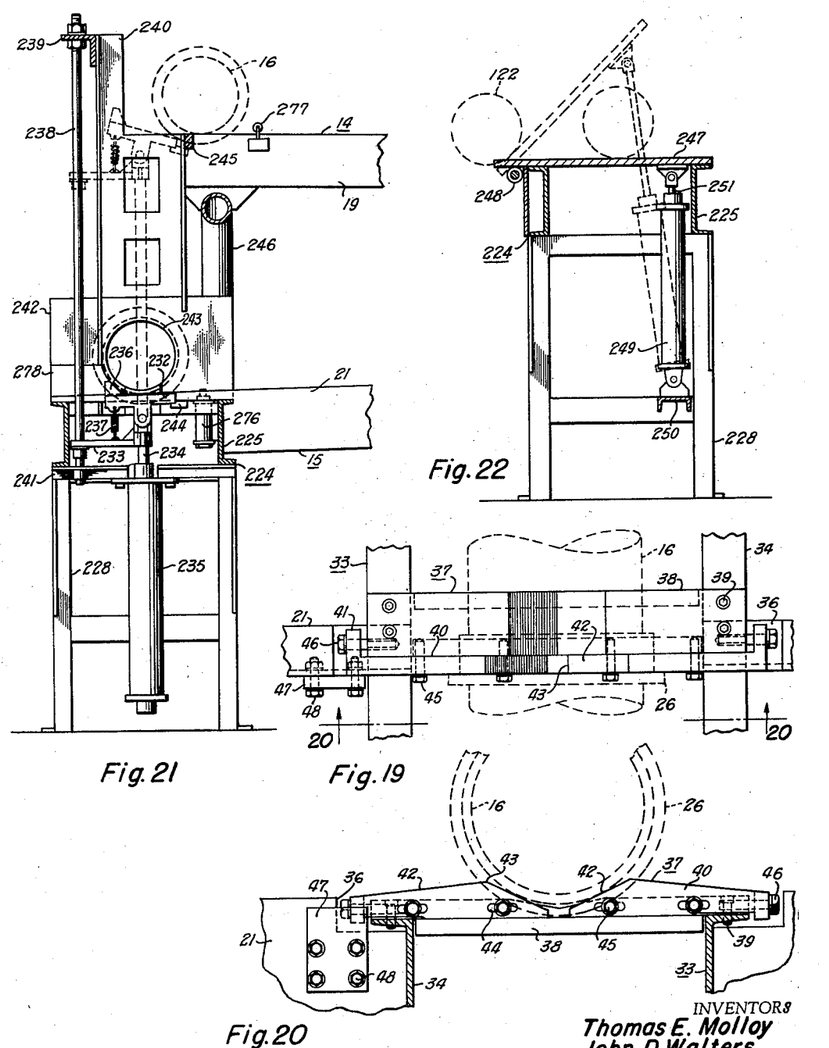
Fig. 19 is an enlarged, plan view of one of the means for alining a flask with the sand blowing means.
Fig. 20 is a vertical, sectional view, taken on the line 20—20 of Figs. 1 and 19.
Fig. 21 is a vertical, sectional view, taken on the line 21—21 of Fig. 4, showing the elevator for lifting a flask from the lower to the upper track.
Fig. 22 is a vertical, sectional view, taken on the line 22—22 of Fig. 4, showing the tilting means for dumping the sand mold and pipe.

The elevator 18 includes a horizontal carriage or platform 232 pivotally mounted by a bracket 233 on the upper end of the piston rod 234 of an upright pressure fluid cylinder 235 between the longitudinal beams 225 between the outer end portions of the track beams (Fig. 21). Stop shoulders 236 for engagement by the flask are provided on the outer longitudinal margin of the platform 232 which is connected to the bracket 233 by a helical spring 237 for maintaining said platform in its horizontal position and permitting clockwise tilting thereof. The bracket is slidably mounted on upright guide rods 238 extending between an upper cross bar 239, which is supported by upright members 240, and lower cross bars 241 which support the cylinder 235. An upright bulkhead or stop plate 242 overlies the inner face of one of the members 240 and a circular opening 243 extends through the plate and member in axial alinement with the cylinder 228 to accommodate the ejected sand mold, end cores and cast pipe. The inner longitudinal margin of the elevator platform carries a lug 244 for engaging a trip bar 245 extending transversely between the upper track beams 19 to tilt said platform and roll the empty flask onto said track beams when said flask is raised as shown in broken lines in Fig. 21. An inverted U-shaped standard 246 may upstand from the inner beam 225 to support the ends of the upper track beams.

For receiving the ejected sand mold, end cores and cast pipe, a horizontal dump table 247 overlies and extends longitudinally of the end of the frame 224 opposite the cylinder 228. As shown by the numeral 248 in Fig. 22, the outer longitudinal margin of the table 247 is pivotally attached to the outer beam 225 for counter-clockwise tilting. A pressure fluid cylinder 249 is pivotally mounted on a bar 250 extending between the standards 228 and has its piston rod 251 pivotally connected to the table for tilting the same upon elevating of the platform 232 by the cylinder 235. Although not shown, it is preferable to dump the mold, cores and pipe onto suitable conveying means. As has been explained, the empty flasks roll down the upper track beams 19 to the elevator 17.

Figure 24:
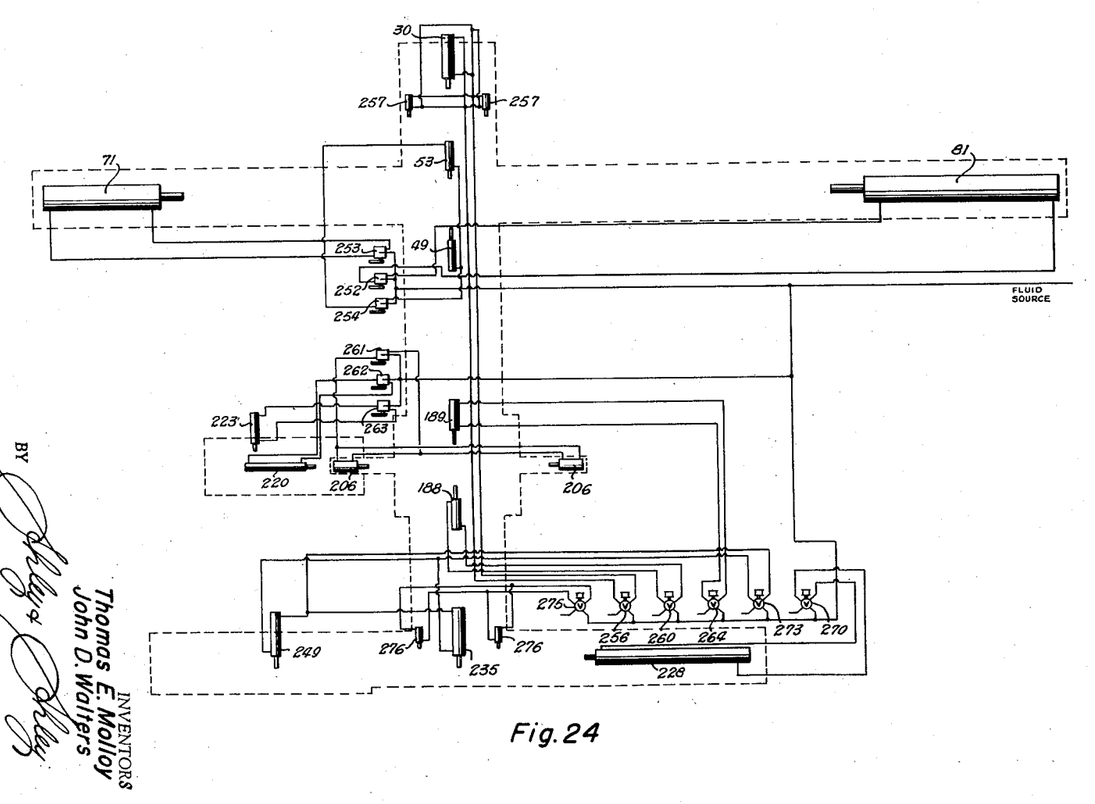
Fig. 24 is a flow diagram of the pressure fluid means.
Figure 25:
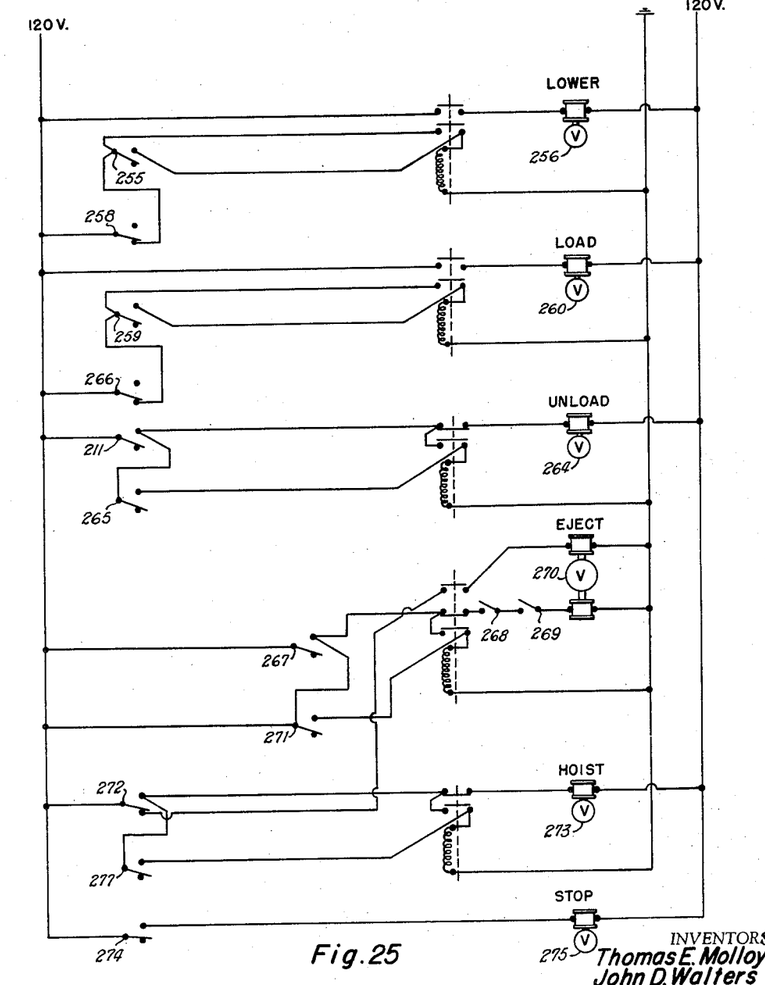
Fig. 25 is a wiring diagram.

For operating the pipe molding machine in sequence, a plurality of control valves and switches are provided as shown in Figs. 24 and 25. Since the flow and electrical connections are conventional, it is believed unnecessary to describe the same. With a flask supported by the alining device 37 at the sand blowing station 11, a valve 252 is opened to actuate the cylinder 81 for inserting the mandrel 77 into the flask. The cylinder 71 is then actuated by opening a valve 253 to advance the blow box 62 and insert its pattern assembly into the other end of the flask for engagement with the mandrel. After sand is blown into the flask to form the mold, valves 252 and 253 are reversed to retract the mandrel, blow box and pattern assembly. A common valve 254 is provided for controlling the actuation of the cylinders 49 and 53 and is moved in one direction to retract the piston rod 51 and raise the yoke 52 for lifting the flask from the alining device 37 onto the lower track 15. The valve 254 is then reversed to eject the rod 51 and lower the yoke. As the flask leaves the alining device, it rolls over and closes a switch 255 mounted on one of the track beams 21 (Figs. 1, 2 and 25) for opening a valve 256 which actuates the cylinder 30 for lowering the elevator 17. The valve 256 also controls the actuation of the plungers of a pair of cylinders 257 mounted on the upper track beams 19 (Fig. 1) adjacent the elevator for preventing the following empty flask from rolling off said beams on lowering of said elevator. The flask on the carriage 28 is directed onto the lower track by the curved portion 23 of the latter and rolls over a switch 258 on one of the beams of said track (Fig. 2) for reversing the valve 256 to raise the elevator and retract the plungers of the cylinders 257 thereby permitting the following flask to roll onto said elevator.

As shown in Fig. 18, a switch 259 is mounted at the interruption 170 of the lower track beams at the flask spinning and pipe casting station 12 for engagement by the flask to open a valve 260 which actuates the cylinder 188. This pivots the yoke 182 downwardly and permits the flask to roll onto the wheels 173. A valve 261 is opened to actuate the cylinders 206 for advancing the core holders 191 into engagement with the ends of the flask. After the motor 180 is energized to commence spinning of the flask, a valve 262 is opened for actuating the cylinder 220 to advance the carriage 214 and engage the shoe spout 219 in one end of said flask. The cylinder 223 is next actuated by opening a valve 263 for tilting the ladle 218 to pour molten metal into the spinning flask. The valves 262 and 263 are reversed to retract the carriage and untilt the ladle, after which, the valve 261 is reversed to retract the core holders and close the switch 211 which is mounted on one of said core holders (Fig. 16). A valve 264 is opened by the switch 211 for actuating the cylinder 189 to pivot the yoke 183 upwardly and lift and roll the flask from the wheels 173 back onto the lower track. The yoke 183 strikes a switch 265 which is suspended from the upper track (Figs. 2 and 18) for reversing the valve 264 to pivot said yoke downwardly. A switch 266 is mounted on one of the track beams 21 for engagement by the flask to reverse the valve 260 and pivot the yoke 182 upwardly, when said flask rolls toward the sand mold and cast pipe ejecting station 13.

The flask rolls onto the outer end portions of the lower track beams over the elevator 18 and closes a switch 267 on the carriage 232, the following flask closes a switch 268 on one of said track beams, and the third flask closes a switch 269 also on said track beam for opening a valve 270. This actuates the cylinder 228 to eject the ram 230 and push the sand mold and cast pipe from the flask onto the dump table 247. A switch 271 at the outer end of the cylinder is closed by the pressure build up in said cylinder for reversing the valve 270 to retract the ram which closes a switch 272 on its retraction. The switch 272 opens a valve 273 for actuating the cylinders 235 and 249 to raise the elevator 18 and lift the empty flask as well as tilt the table to dump the sand mold and cast pipe. When the elevator rises, a switch 274 (Fig. 1) closes for opening a valve 275 which controls the actuation of the plungers of a pair of cylinders 276 (Fig. 21) mounted on the lower track beams adjacent the elevator. The cylinders 276 are similar to the cylinders 257 and their plungers are ejected to prevent the following flask from rolling off of the lower track. When the flask rolls off of the elevator carriage onto the upper track, it engages and closes a switch 277 mounted on one of the beams 19 for reversing the valve 273 to retract the piston rods of the cylinders 235 and 249. This lowers the elevator and untilts the dump table, and the lowered elevator engages the switch 274 to reverse the valve 275 for retracting the plungers of the cylinders 276 to permit the following flask to roll onto said elevator. The valves shown in Fig. 25 are of the solenoid type and have suitable relays associated therewith and electrically connected between said valves and their switches. Since the valve 270 controls both the ejection and retraction of the ram 230, it is of the double solenoid type.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In a pipe molding machine, means for forming a sand mold in a hollow cylindrical flask including means for supporting the flask with its longitudinal axis in a substantially horizontal plane, a substantially cylindrical and coextensive pattern member for extending coaxially of the flask in spaced relation to its inner wall and coacting therewith to form an annular elongated sand receiving and shaping chamber, means for imparting relative longitudinal movement to the pattern member to position said member in and withdraw the same from the flask, a coaxial pattern element for extending through one end of the flask into mating engagement with said pattern member, means for directing sand under air pressure into the annular chamber endwise around the pattern element, means for permitting air to escape from said chamber while retaining sand therein so as to fill said chamber with packed sand, said pattern element having a stationary portion forming a portion of the shaping chamber and carrying a portion of enlarged diameter, said portion of enlarged diameter forming an internal shoulder on the sand mold, the enlarged portion being movable outwardly and longitudinally of the flask relative to said stationary portion of the pattern element upon engagement by the inwardly moving pattern member, and means for moving said enlarged portion inwardly of the flask upon the outward movement of said pattern member whereby its enlarged diameter compacts the shoulder of the sand mold.

2. Sand mold forming means as set forth in claim 1 wherein the movable portion of the pattern element is in the form of a piston having an external radial shoulder, said pattern element having an internal pressure fluid cylinder for slidably supporting the piston.

3. Sand mold forming means as set forth in claim 1 wherein the pattern element includes an internal pressure fluid cylinder and a piston slidably mounted in the cylinder, the movable portion of said element being connected to the piston and having a radial shoulder externally of said cylinder, said portion having an extremity of reduced diameter for mating engagement with the pattern member.

4. Sand mold forming means as set forth in claim 1 wherein the pattern element includes a coaxial pressure fluid cylinder and a piston slidably mounted in the cylinder, the movable portion of said element being carried by the piston.

5. Sand mold forming means as set forth in claim 1 wherein the sand directing means includes a slidable blow box connected to the pattern element and having an opening externally thereof for communicating with the annular chamber of the flask, means for reciprocating the blow box longitudinally of the flask to move said pattern element into and out of engagement with said pattern member, stationary means overlying and communicating with said blow box when said box is reciprocated inwardly for supplying sand thereto, and means for supplying air under pressure to said box to force sand through its opening into said chamber.

6. Sand mold forming means as set forth in claim 5 wherein the blow box includes a chamber having open upper and lower ends and communicating with the opening, and means below and spaced from the stationary means for closing the lower end of the box chamber when said blow box is reciprocated inwardly and the upper end of said chamber is in communication with said stationary means.

7. In a pipe molding machine, means for forming a sand mold in a hollow cylindrical flask including means for supporting the flask with its longitudinal axis in a substantially horizontal plane, a substantially cylindrical and coextensive pattern member for extending coaxially of the flask in spaced relation to its inner wall and coacting therewith to form an annular elongated sand receiving and shaping chamber, means for imparting relative longitudinal movement to the pattern member to position said member in and withdraw the same from the flask, a coaxial pattern element for extending through one end of the flask into mating engagement with said pattern member and for closing the latter end of the flask, a slidable blow box connected to and supporting the pattern element, the blow box having a chamber and openings surrounding said pattern element for communicating with the annular chamber of the flask, means for reciprocating said blow box longitudinally of the flask to move said pattern element into and out of engagement with said pattern member and flask, stationary means overlying said blow box and communicating with its chamber when said box is reciprocated inwardly for supplying sand to the chamber, means for supplying air under pressure to said blow box chamber to direct sand into said annular chamber endwise around said pattern element, means for permitting air to escape from said annular chamber while retaining sand therein so as to fill said annular chamber with packed sand, the chamber of the blow box having open upper and lower ends and communicating with the stationary means through its upper end when said blow box is reciprocated inwardly, and means below and spaced from said stationary means for closing the lower end of said chamber upon inward reciprocation of said box.

8. Sand mold forming means as set forth in claim 7 wherein the means for closing the lower end of the blow box chamber includes a sealing element and a vertically reciprocal member for supporting and moving the sealing element into and out of engagement with the blow box.

References Cited in the file of this patent
UNITED STATES PATENTS

| | | |
|---|---|---|
| 2,449,900 | Johnston | Sept. 21, 1948 |
| 2,563,843 | Johnston | Aug. 14, 1951 |
| 2,631,342 | Romine | Mar. 17, 1953 |
| 2,682,690 | Worthington | July 6, 1954 |
| 2,731,690 | Coupland | Jan. 24, 1956 |
| 2,757,424 | Daniel et al. | Aug. 7, 1956 |
| 2,779,071 | Herbruggen | Jan. 29, 1957 |
| 2,791,013 | Demmler | May 7, 1957 |
| 2,796,643 | Kaveny | June 25, 1957 |